(12) United States Patent
Takeuchi et al.

(10) Patent No.: US 10,871,698 B2
(45) Date of Patent: Dec. 22, 2020

(54) DISPLAY DEVICE

(71) Applicant: Japan Display Inc., Minato-ku (JP)

(72) Inventors: Takahiro Takeuchi, Tokyo (JP);
Yoshitaka Ozeki, Tokyo (JP); Koji Ishizaki, Tokyo (JP); Tomoyasu Hirano, Tokyo (JP); Koshiro Moriguchi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/361,536

(22) Filed: Mar. 22, 2019

(65) Prior Publication Data

US 2019/0302565 A1 Oct. 3, 2019

(30) Foreign Application Priority Data

Mar. 28, 2018 (JP) ................. 2018-062495

(51) Int. Cl.
*G02F 1/167* (2019.01)
*G02F 1/1343* (2006.01)
*G02F 1/1362* (2006.01)

(52) U.S. Cl.
CPC ............ *G02F 1/167* (2013.01); *G02F 1/1343* (2013.01); *G02F 1/136286* (2013.01)

(58) Field of Classification Search
CPC .. G02F 1/167; G02F 1/136286; G02F 1/1343; G02F 1/16762; G02F 1/16766; G02F 1/16757
See application file for complete search history.

(56) References Cited

U.S. PATENT DOCUMENTS

2011/0181502 A1* 7/2011 Kim ................. G02F 1/167
345/107
2015/0286084 A1* 10/2015 Yoshida ............ G02F 1/1345
257/43
2017/0322462 A1* 11/2017 Lee .................. G02F 1/13394

FOREIGN PATENT DOCUMENTS

JP 2011-221097 11/2011

* cited by examiner

*Primary Examiner* — Kent W Chang
*Assistant Examiner* — Andrew Lee
(74) *Attorney, Agent, or Firm* — Oblon, McClelland, Maier & Neustadt, L.L.P.

(57) ABSTRACT

According to one embodiment, a display device includes a capacitance electrode, a first pixel electrode overlapping the capacitance electrode, a second pixel electrode overlapping the capacitance electrode, a shield layer disposed between the first pixel electrode and the second pixel electrode, a common electrode, and an electrophoretic element disposed between the common electrode and the first pixel electrode and between the common electrode and the shield layer. The first pixel electrode and the second pixel electrode are arranged along a first direction, and the shield layer extends in a second direction which crosses the first direction between the first pixel electrode and the second pixel electrode.

15 Claims, 8 Drawing Sheets

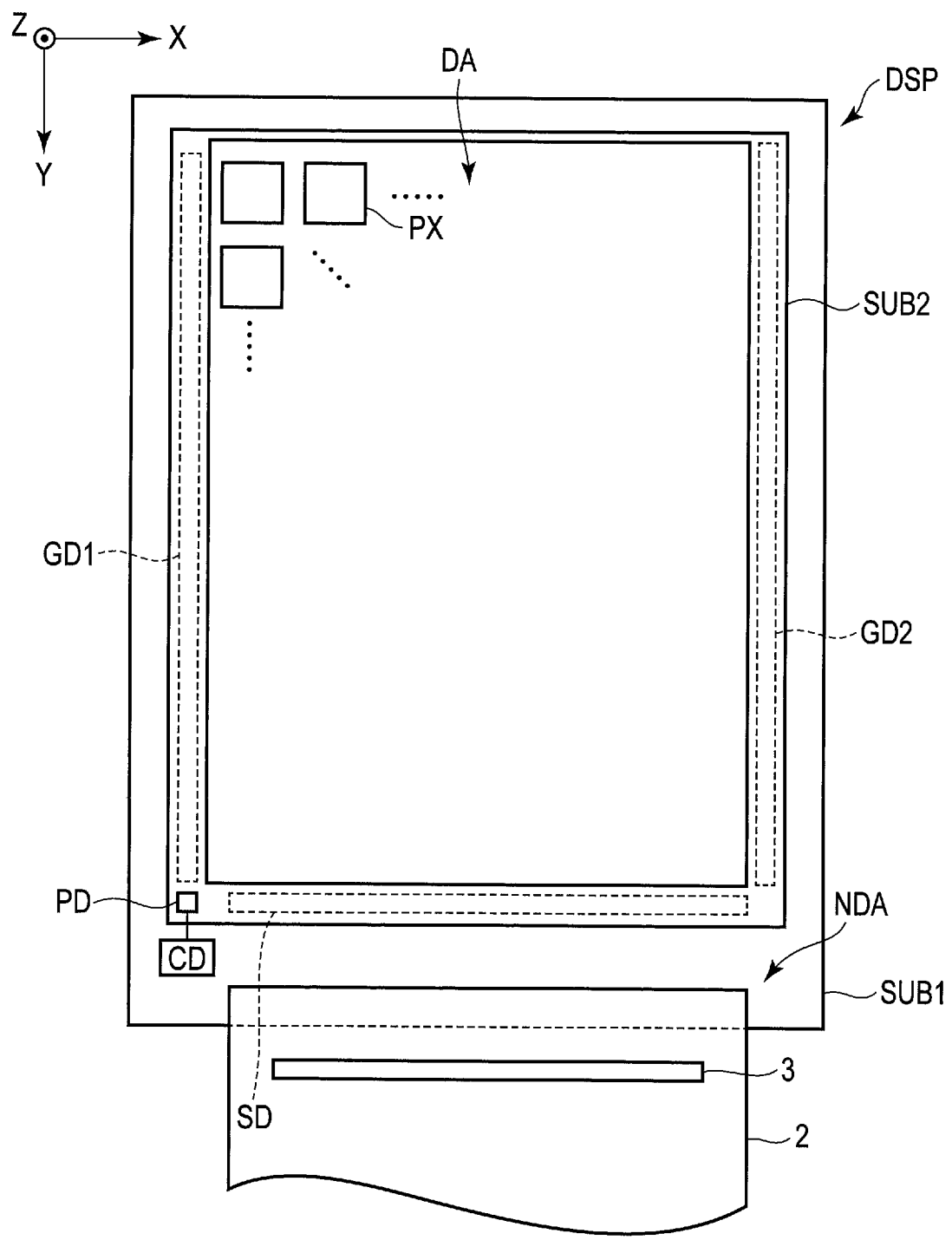
F I G. 1

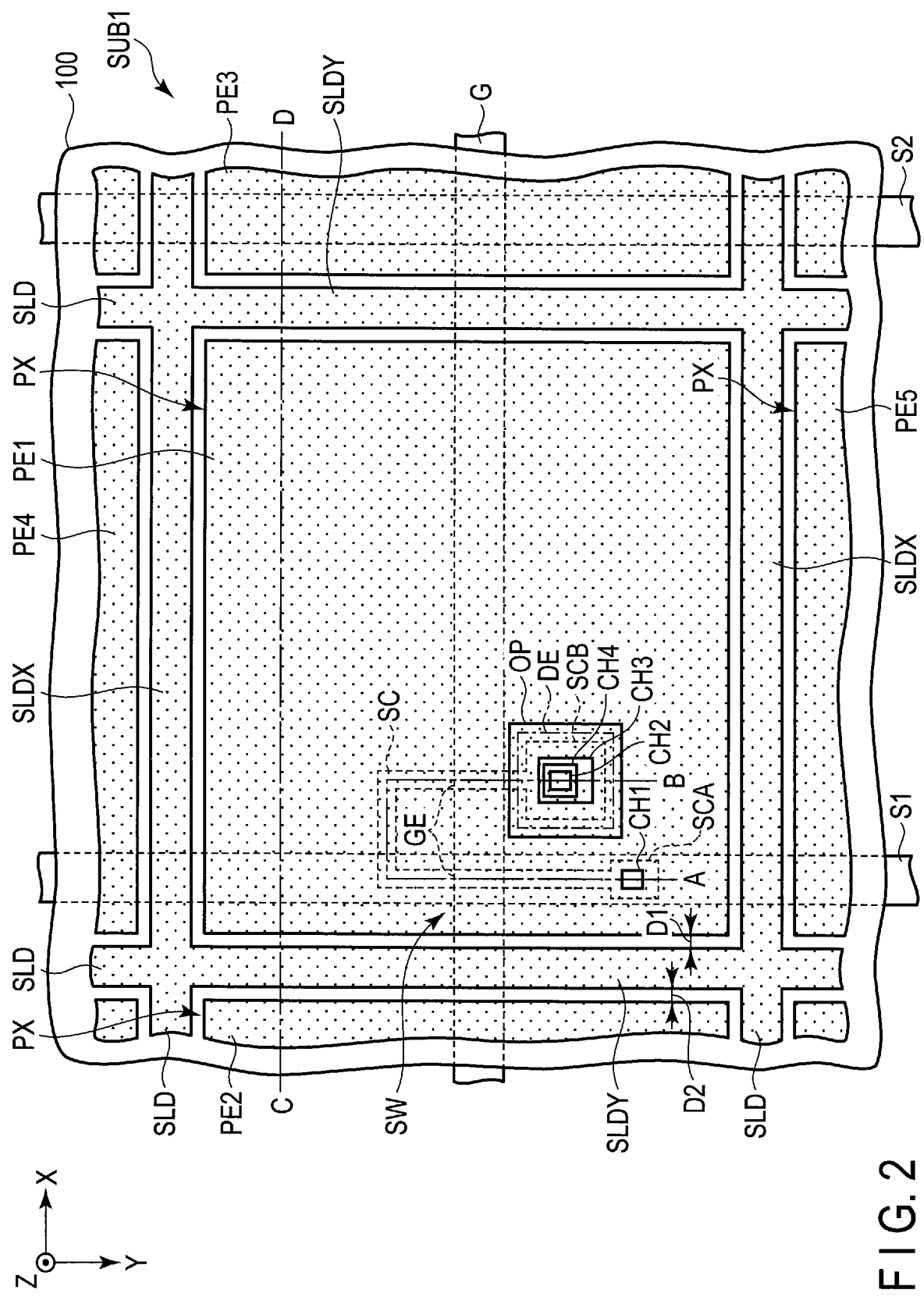
F I G. 2

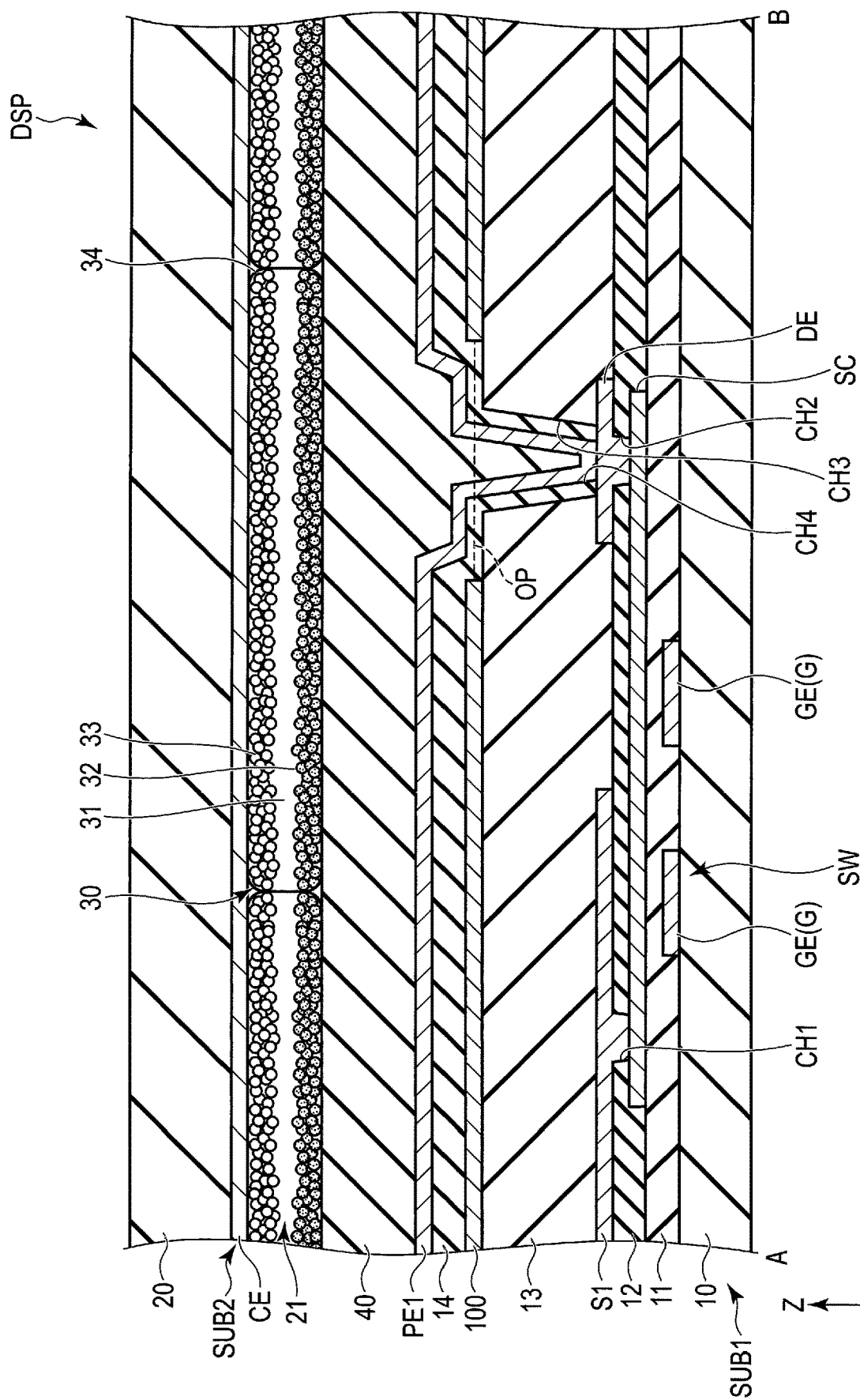
F I G. 3

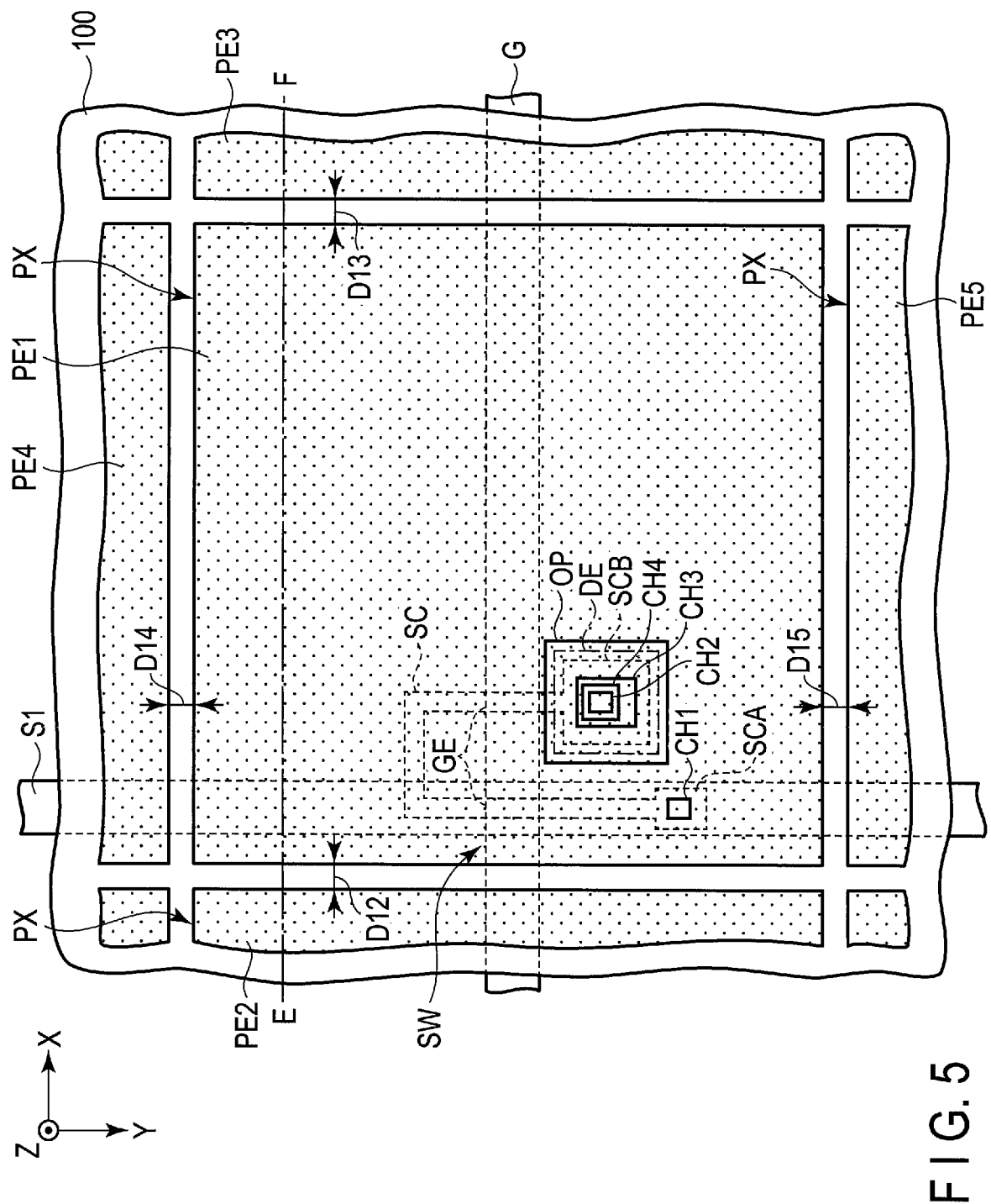
F I G. 5

DISPLAY DEVICE

CROSS-REFERENCE TO RELATED APPLICATIONS

This application is based upon and claims the benefit of priority from Japanese Patent Application No. 2018-062495, filed Mar. 28, 2018, the entire contents of which are incorporated herein by reference.

FIELD

Embodiments described herein relate generally to a display device.

BACKGROUND

For example, an electrophoretic display device in which an electrophoretic element is held between an element substrate and a counter substrate is known. In such an electrophoretic display device, a capacitance electrode is formed over substantially the entire surface of a display part, and all pixel electrodes overlap the capacitance electrode. Therein, an electric field from the capacitance electrode may leak through gaps of adjacent pixel electrodes. The leaked electric field in gaps of the pixel electrodes may cause an erroneous action of the electrophoretic element and deterioration of display quality.

BRIEF DESCRIPTION OF THE DRAWINGS

FIG. 1 is a plan view of an example of a display device DSP of an embodiment.

FIG. 2 is a plan view showing a first structural example of a pixel PX of the display device DSP of FIG. 1.

FIG. 3 is a cross-sectional view of the display device DSP including the pixel PX, taken along line A-B of FIG. 2.

FIG. 5 is a plan view showing a second structural example of a pixel PX of the display device DSP of FIG. 1.

DETAILED DESCRIPTION

Figure 4:
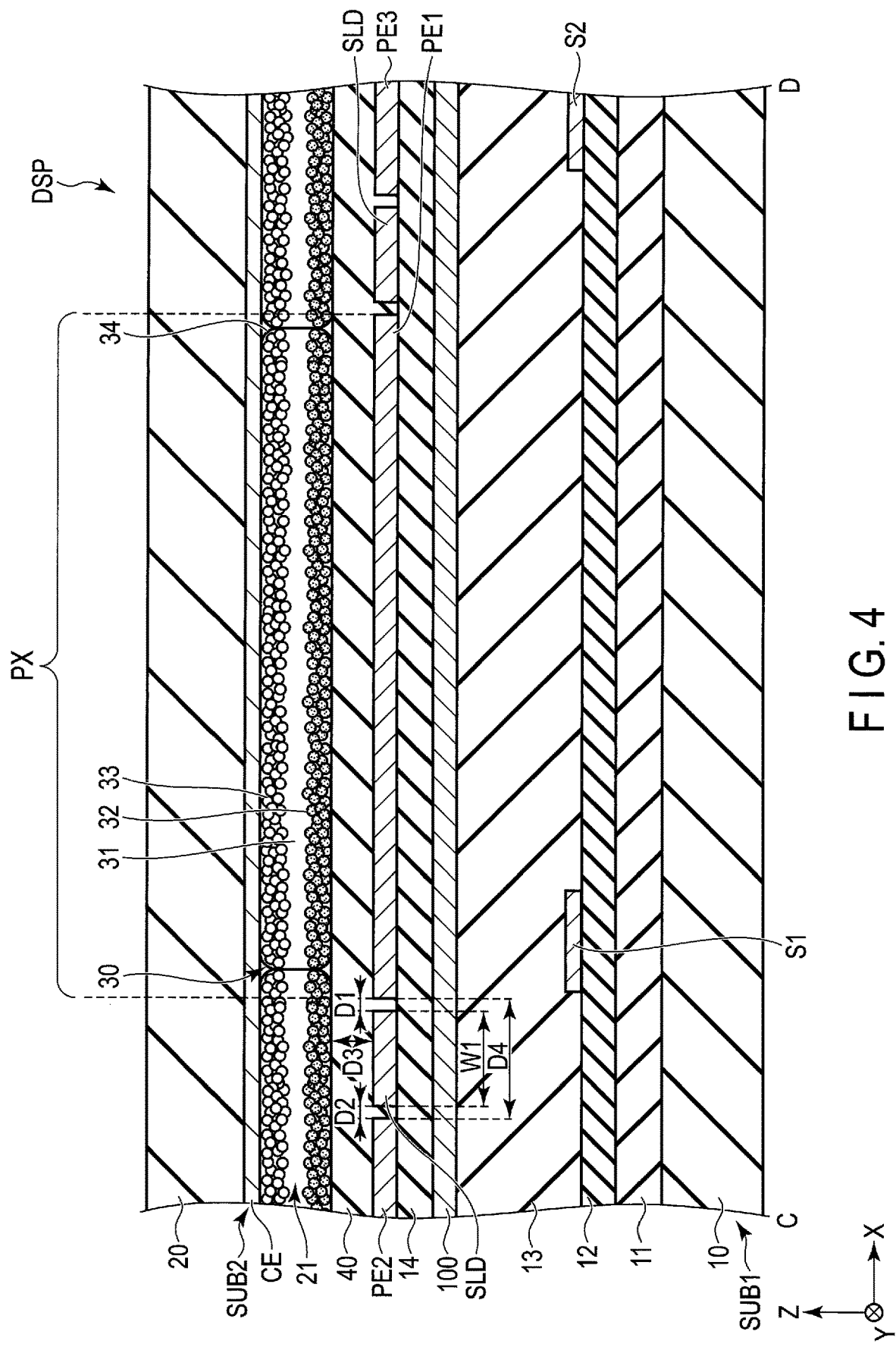
FIG. 4 is a cross-sectional view of the display device DSP including the pixel PX, taken along line C-D of FIG. 2.

In general, according to one embodiment, a display device includes a capacitance electrode, a first pixel electrode overlapping the capacitance electrode, a second pixel electrode overlapping the capacitance electrode and adjacent to the first pixel electrode, a shield layer disposed between the first pixel electrode and the second pixel electrode and being apart from the first pixel electrode and the second pixel electrode, a common electrode, and an electrophoretic element disposed between the common electrode and the first pixel electrode and between the common electrode and the shield layer. The first pixel electrode and the second pixel electrode are arranged along a first direction, and the shield layer extends in a second direction which crosses the first direction between the first pixel electrode and the second pixel electrode.

According to another embodiment, a display device includes a scan line extending in a first direction, signal line extending in a second direction crossing the first direction, a capacitance electrode overlapping the scan line and the signal line, a pixel electrode overlapping the capacitance electrode, and a shield layer formed as a lattice surrounding the pixel electrode in a plan view. The shield layer is apart from the pixel electrode, and the shield layer crosses the scan line and the signal line in a plan view.

According to yet another embodiment, a display device includes a capacitance electrode, a first pixel electrode overlapping the capacitance electrode, a second pixel electrode overlapping the capacitance electrode and adjacent to the first pixel electrode, a common electrode, and an electrophoretic element disposed between the common electrode and the first pixel electrode. A first gap between the first pixel electrode and the second pixel electrode is less than a second gap between the first pixel electrode and the electrophoretic element.

Hereinafter, embodiments will be explained with reference to accompanying drawings. Note that, the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

FIG. 1 is a plan view showing an example of a display device DSP of an embodiment. In this example, a first direction X, second direction Y, and third direction Z are orthogonal to each other; however, they may cross each other at an angle other than 90 degrees. The first direction X and the second direction Y correspond to a direction parallel to the main surface of a substrate of the display device DSP, and the third direction Z corresponds to a thickness direction of the display device DSP. In this application, a position in a tip side of an arrow representing the third direction Z will be referred to as above (or up), and a position in a base side of the arrow will be referred to as below (or down). Furthermore, when an observation position is hypothetically set in the tip side of the arrow representing the third direction Z to observe the display device DSP, seeing an X-Y plane defined by the first direction X and the second direction Y will be referred to as plan view.

The display device DSP includes a first substrate SUB1 and a second substrate SUB2. A display part DA to display an image is positioned in an area where the first substrate SUB1 and the second substrate SUB2 overlap with each other in a plan view. The display part DA includes a plurality of pixels PX arranged in a matrix in the first direction X and the second direction Y. A non-display part NDA around the display part DA is shaped as a frame. Gate drivers GD1 and GD2 and a source driver SD are positioned in the non-display part NDA and are provided with the first substrate SUB1. Furthermore, a power supply pad PD is positioned in the non-display part NDA and is provide with the first substrate SUB1 to overlap the second substrate SUB2. The power supply pad PD is connected to a power source CD of common potential.

A flexible printed circuit 2 is connected to the first substrate SUB1. An IC chip 3 is connected to the flexible printed circuit 2. Note that the IC chip 3 may be connected to the first substrate SUB1. The gate drivers GD1 and GD2, source driver SD, and power source CD may be included in the IC chip 3.

FIG. 2 is a plan view showing a first structural example of the pixel PX of the display device DSP of FIG. 1. In this example, only the main elements of the pixel PX of the first substrate SUB1 of FIG. 1 are shown. The first substrate SUB1 includes a scan line G, signal lines S1 and S2, switching element SW, capacitance electrode 100, pixel electrodes PE1 to PE5, and shield layer SLD.

The scan line G extends in the first direction X, and is connected to one of the gate drivers GD1 and D2 of FIG. 1. The signal lines S1 and S2 are arranged in the first direction X with a gap therebetween. The signal lines S1 and S2 extend in the second direction Y and are connected to the source driver SD of FIG. 1.

The switching element SW is positioned in a crossing portion of the scan line G and the signal line S1. The switching element SW includes a semiconductor layer SC, gate electrode GE, and drain electrode DE. Note that the switching element SW has a double gate structure; however, it may have a single gate structure. Furthermore, the switching element SW may have a top gate structure in which the gate electrode GE is disposed above the semiconductor layer SC, or may have a bottom gate structure in which the gate electrode GE is disposed below the semiconductor layer SC.

The semiconductor layer SC includes an end SCA overlapping the signal line S1 and an end SCB overlapping the drain electrode DE. The end SCA is electrically connected to the signal line S1 in a through hole CH1. The end SCB is electrically connected to the drain electrode DE in a through hole CH2. The semiconductor layer SC crosses the scan line G between the ends SCA and SCB. The gate electrode GE corresponds to an area overlapping the semiconductor layer SC of the scan line G. The drain electrode DE is shaped as an island and is positioned between the signal lines S1 and S2.

The capacitance electrode 100 is arranged over the pixels PX arranged in the first direction X and the second direction Y, and overlaps with the scan line G and the signal lines S1 and S2. The capacitance electrode 100 includes, in each pixel PX, an opening OP in a position overlapping the drain electrode DE. The capacitance electrode 100 is formed in substantially the entire area of the display part DA of FIG. 1 and is electrically connected to the power supply pad PD in the non-display part NDA.

The pixel electrode PE1 overlaps, in the pixels PX, the capacitance electrode 100, switching element SW, scan line G, and signal line S1. The pixel electrode PE1 is electrically connected to the drain electrode DE in the opening OP and through holes CH3 and CH4. In the example depicted, the pixel electrode PE1 is formed as a square in which a length along the first direction X and a length along the second direction Y are equal; however, this is merely an example. The pixel electrode PE1 may be formed as a rectangle extending in the first direction X or the second direction Y, or may be formed as another polygon.

As shown in the figure, four pixel electrodes PE2 to PE5 are arranged around the pixel electrode PE1, and overlap the capacitance electrode 100. The pixel electrodes PE2, PE1, and PE3 are arranged in the first direction X in this order, and overlap the scan line G. The pixel electrodes PE4, PE1, and PE5 are arranged in the second direction Y in this order, and overlap the signal line S1.

The shield layer SLD is formed as a lattice surrounding the pixel electrode PE1 in a plan view, and overlap the capacitance electrode 100. The shield layer SLD is, for example, electrically floating. The shield layer SLD is apart from each of the pixel electrodes PE1 to PE5. The shield layer SLD includes a part SLDY extending in the second direction Y between the pixel electrodes PE1 and PE2 and between the pixel electrodes PE 1 and PE3, and crosses the scan line G in a plan view. The shield layer SLD includes a part SLDX extending in the first direction X between the pixel electrodes PE1 and PE4 and between the pixel electrodes PE1 and PE5, and crosses the signal line S1 in a plan view.

FIG. 3 is a cross-sectional view of the display device DSP including the pixel PX, taken along line A-B of FIG. 2. The first substrate SUB1 further includes a base substrate 10, and insulating films 11 to 14. The base substrate 10 is an insulating substrate formed of an insulative glass or a resin such as polyimide resin. The base substrate 10 is positioned in the opposite side of the observation position with respect to the second substrate SUB2, and thus, may be a non-transparent substrate or may be a transparent substrate.

The gate electrode GE integrated with the scan line G is positioned on the base substrate 10 and is covered with the insulating film 11. The scan line G and the gate electrode GE are formed of a metal material such as aluminum (Al), titanium (Ti), silver (Ag), molybdenum (Mo), tungsten (W), copper (Cu), or chrome (Cr), or an alloy of a combination of these metal materials, and may be formed in a single layer structure or in a layered structure. The semiconductor layer SC is positioned on the insulating film 11 and is covered with the insulating film 12. The semiconductor layer SC is formed of, for example, a polycrystalline silicon (for example, low temperature polysilicon); however, it may be formed of amorphous silicon or a semiconductor oxide. The signal line S1 and the drain electrode DE are positioned on the insulating film 12 and are covered with the insulating film 13. The signal line S1 and the drain electrode DE are formed of the same material, and for example, formed of the above-mentioned metal materials. The signal line S1 is in contact with the semiconductor layer SC in the through hole CH1 passing through the insulating film 12. The drain electrode DE is in contact with the semiconductor layer SC in the through hole CH2 passing through the insulating film 12.

The capacitance electrode 100 is positioned on the insulating film 13 and is covered with the insulating film 14. The capacitance electrode 100 is a transparent electrode formed of a transparent conductive material such as indium tin oxide (ITO) or indium zinc oxide (IZO).

The pixel electrode PE1 is positioned on the insulating film 14. The pixel electrode 100 is in contact with the drain electrode DE in the opening OP of the capacitance electrode 100, through hole CH3 passing through the insulating film 13, and through hole CH4 passing through the insulating film 14. The pixel electrode PE1 is a transparent electrode formed of a transparent conductive material such as ITO or IZO. The pixel electrode PE1 overlaps the capacitance electrode 100 through the insulating film 14 and forms a capacitance of the pixel PX.

The insulating films 11, 12, and 14 each correspond to an inorganic insulating film formed of an inorganic material such as silicon oxide (SIC), silicon nitride (SiN), or silicon oxynitride (SiON). The insulating films 11, 12, and 14 each may have a single layer structure or a layered structure. The insulating film 13 corresponds to an organic insulating film formed of an organic material such as acrylic resin. The insulating film 13 is thicker than any of the above-mentioned inorganic insulating films (insulating films 11, 12, and 14).

The second substrate SUB2 includes a base substrate 20, a common electrode CE, and an electrophoretic element 21. In the example depicted, the second substrate SUB2 does not include a light shielding layer defining the pixels PX. The base substrate 20 is formed of an insulative glass or a resin such as polyimide resin. The base substrate 20 is positioned in the observation position side with respect to the first substrate SUB1, and thus, is a transparent substrate. The common electrode CE is positioned between the base substrate 20 and the electrophoretic element 21. The common electrode CE is a transparent electrode formed of a transparent conductive material such as ITO or IZO. The common electrode CE is electrically connected to the power supply pad PD in the non-display part NDA of FIG. 1. That is, the common electrode CE and the capacitance electrode 100 are the same potential. The electrophoretic element 21 is disposed between the pixel electrode PE1 and the common electrode CE. The electrophoretic element 21 is formed of a plurality of microcapsules 30 arranged in the X-Y plane almost without a gap therebetween.

The first substrate SUB1 and the second substrate SUB2 are adhered by an adhesion layer 40. In the example depicted, the adhesion layer 40 is positioned between the pixel electrode PE1 and the electrophoretic element 21.

The microcapsule 30 has a diameter of approximately 20 to 70 μm. A plurality of microcapsules 30 are arranged between one pixel electrode PE1 and the common electrode CE. For example, approximately one to ten microcapsules 30 are arranged on the pixel electrode PE of a rectangular shape or a polygonal shape in which one side has a length of approximately one hundred to several hundreds of μm.

The microcapsule 30 includes a dispersion medium 31, a plurality of black particles 32, and a plurality of white particles 33. The black particles 32 and the white particles 33 may be referred to as electrophoretic particles. An outer shell 34 of the microcapsule 30 is formed of a transparent resin such as acrylic resin. The dispersion medium 31 is, in the microcapsule 30, a solution to disperse the black particles 32 and the white particles 33. The black particles 32 are charged with opposite polarity with the white particles 33. For example, the black particles 32 are charged positively and the white particles 33 are charged negatively. Note that the microcapsules 30 may include, in addition to the black particles 32 and the white particles 33, electrophoretic particles of other colors such as red, green, blue, yellow, cyan, and magenta. Furthermore, the electrophoretic particles of other colors may be replaced with at least one of the black particles 32 and the white particles 33.

In the electrophoretic element 21 of above structure, when the pixels PX display black, the pixel electrode PE1 is maintained high potential in comparison with the common electrode CE. That is, if the potential of the common electrode CE is a reference potential, the pixel electrode PE1 is maintained to the positive polarity. Thus, the black particles 32 positively charged are pulled to the common electrode CE while the white particles 33 negatively charged are pulled to the pixel electrode PE1. As a result, black is recognized when the pixels PX are observed from the above the second substrate SUB2.

On the other hand, when the pixels PX display white, the pixel electrode PE1 is maintained low potential in comparison with the common electrode CE. That is, if the potential of the common electrode CE is a reference potential, the pixel electrode PE1 is maintained to the negative polarity. Thus, the white particles 33 negatively charged are pulled to the common electrode CE side while the black particles 32 positively charged are pulled to the pixel electrode PE1. As a result, white is recognized when the pixels PX are observed.

FIG. 4 is a cross-sectional view of the display device DSP including the pixel PX, taken along line C-D of FIG. 2. The pixel electrodes PE1 to PE3 and the shield layer SLD are positioned on the insulating film 14. The pixel electrodes PE1 to PE3 and the shield layer SLD are positioned in the same layer and are formed of the same material. For example, the pixel electrodes PE1 to PE3 and the shield layer SLD are transparent electrodes formed of a transparent conductive material such as ITO or IZO. In the example depicted, the pixel electrodes PE1 to PE3 overlap the capacitance electrode 100 through the insulating film 14 and form a capacitance of each pixel. The shield layer SLD overlaps the capacitance electrode 100 through the insulating film 14. The electrophoretic element 21 is positioned between the pixel electrodes PE1 to PE3 and the common electrode CE. Furthermore, the electrophoretic element 12 is positioned between the shield layer SLD and the common electrode CE. The adhesive layer 40 is positioned between the pixel electrodes PE1 to PE3 and the electrophoretic element 21. Furthermore, the adhesive layer 40 is positioned between the shield layer SLD and the electrophoretic element 21. Between the pixel electrodes PE1 to PE3 and the shield layer SLD, the adhesive layer 40 is in contact with the insulating film 14.

Now, a positional relationship between the shield layer SLD, pixel electrodes PE1 and PE2, and electrophoretic element 21.

The shield layer SLD is positioned between the pixel electrode PE1 and the pixel electrode PE2. A gap D1 between the shield layer SLD and the pixel electrode PE1 and a gap D2 between the shield layer SLD and the pixel electrode PE2 correspond to a distance along the first direction X. The gaps D1 and D2 are substantially constant in the second direction Y as shown in FIG. 2. A gap D3 between the shield layer SLD and the electrophoretic element 21 corresponds to a distance along the third direction Z. If the adhesive layer 40 is in contact with each of the shield layer SLD and the electrophoretic element 21, the gap D3 corresponds to a thickness of the adhesive layer 40 on the shield layer SLD. The gap D1 may be substantially equal to the gap D2 or may be different from the gap D2. The gaps D1 and D2 are less than the gap D3. Furthermore, the gaps D1 and D2 are, preferably, set to ⅓ or less than the gap D3. The gaps D1 and D2 are, for example, 5 μm or less, and preferably, set to 2 μm or less. Furthermore, between the pixel electrodes PE1 and PE2, a width W1 of the shield layer SLD in the first direction X is equal to or greater than the gaps D1 and D2.

Note that the shield layer SLD is arranged similarly to the arrangement thereof between the pixel electrodes PE1 and PE2 between the pixel electrodes PE1 and PE3, between the pixel electrodes PE1 and PE4, and between the pixel electrodes PE1 and PE5.

For example, if a gap D4 between the adjacent pixel electrodes PE1 and PE2 along the first direction X is above 10 μm, an electric field between the capacitance electrode 100 and the pixel electrode PE1, or an electric field between the capacitance electrode 100 and the pixel electrode PE2 may be leaked from a gap between the pixel electrodes PE1 and PE2. If the leaked electric field spreads in the third direction Z beyond the thickness of the adhesive layer 40, the electric field acts the electrophoretic element 21 and may cause a malfunction of the electrophoretic element 21.

In the present embodiment, the shield layer SLD is positioned between the capacitance electrode 100 and the electrophoretic element 21 in an area where the capacitance electrode 100 does not overlap the pixel electrode PE1 or PE2. Thus, an electric field between the capacitance electrode 100 and the pixel electrode PE1, or an electric field between the capacitance electrode 100 and the pixel electrode PE2 is blocked by the shield layer SLD and the spread in the third direction z is suppressed. Thus, the electrophoretic element 21 is not easily affected by an undesirable electric field from the capacitance electrode 100. Thus, a malfunction of the electrophoretic element 21 can be suppressed and the deterioration of display quality can be suppressed.

Furthermore, there may be a case where it is difficult to set the gap D4 between adjacent pixel electrodes sufficiently small to suppress the leakage of electric field because of, for example, required resolution, size of pixels PX, and size of pixel electrodes PE. In such a layout, by forming the shield layer SLD between the pixel electrodes PE1 and PE2 in the manufacturing process of the pixel electrodes PE1 and PE2, the leakage of electric field can be suppressed without adding a different process to the manufacturing process.

In the first structural example of FIGS. 2 to 4, the pixel electrode PE1 corresponds to a first pixel electrode, pixel electrode PE2 corresponds to a second pixel electrode, gap D1 corresponds to a first gap, gap D2 corresponds to a second gap, and gap D3 corresponds to a third gap.

Now, different structural examples will be explained. In each structural example, the same elements as in the first structural example will be referred to by the same reference numbers and the explanation thereof may be omitted.

FIG. 5 is a plan view showing a second structural example of a pixel PX of the display device DSP of FIG. 2. The second structural example of FIG. 5 does not include a shield layer SLD and the second structural example is different from the first structural example in this respect. In a plan view, four pixel electrodes PE2 to PE5 are adjacent to the pixel electrode PE1 without another conductive layer interposed therebetween. A gap D12 between the pixel electrodes PE1 and PE2 and a gap D13 between the pixel electrodes PE1 and PE3 each correspond to a distance along the first direction X. A gap D14 between the pixel electrodes PE1 and PE4 and a gap D15 between the pixel electrodes PE1 and PE5 correspond to a distance along the second direction Y. The gaps D12 and D13 are substantially constant along the second direction Y. The gaps D14 and D15 are substantially constant along the first direction X. The gaps D12 to D15 are substantially equal to the gap D1 of FIG. 2, for example.

Figure 6:
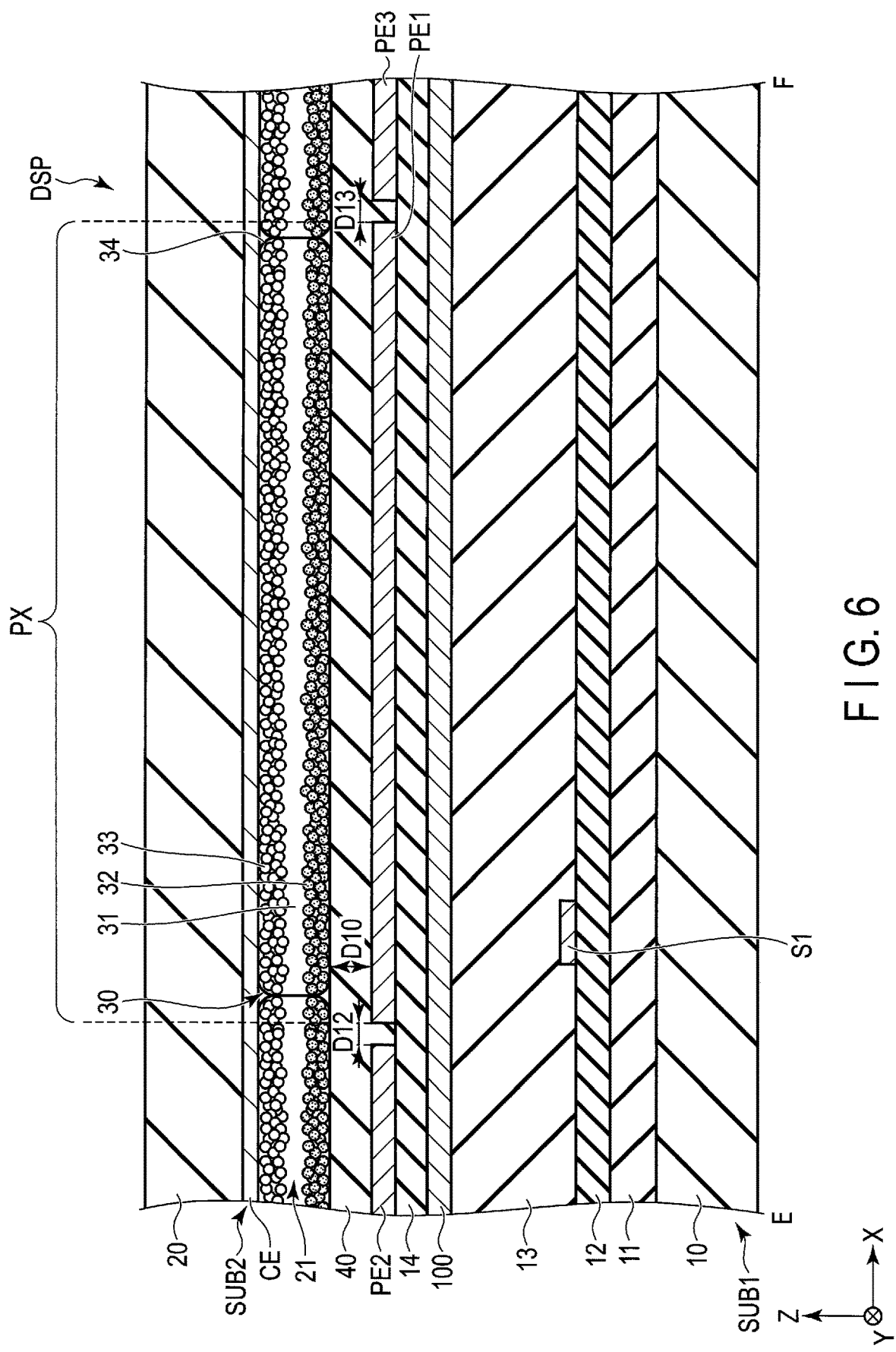
FIG. 6 is a cross-sectional view of the display device DSP including the pixel PX, taken along line E-F. of FIG. 5.

FIG. 6 is a cross-sectional view of the display device DSP including the pixel PX, taken along line E-F of FIG. 5. Between the pixel electrodes PE1 and PE2 and between the pixel electrodes PE1 and PE3, the adhesive layer 40 is in contact with the insulating film 14.

A gap D10 between the pixel electrode PE1 and the electrophoretic element 21 corresponds to a distance along the third direction Z. If the adhesive layer 40 is in contact with each of the pixel electrode PE1 and the electrophoretic element 21, the gap D10 corresponds to a thickness of the adhesive layer 40 on the pixel electrode PE1. The gap D12 may be substantially equal to the gap D13 or may be different from the gap D13. The gaps D12 and D13 are less than the gap D10. Furthermore, the gaps D12 and D13 are, preferably, set to ⅓ or less than the gap D10. The gaps D12 and D13 are, for example, 5 μm or less, and preferably, set to 2 μm or less.

Note that a gap D14 between the pixel electrodes PE1 and PE4 and a gap D15 between the pixel electrodes PE1 and PE5 are, preferably, set to ⅓ or less than the gap D10, and they are, for example, 5 μm or less, and preferably, set to 2 μm or less.

In the second structural example of FIGS. 5 and 6, the pixel electrode PE1 corresponds to a first pixel electrode, pixel electrode PE2 corresponds to a second pixel electrode, gap D12 corresponds to a first gap, and gap D10 corresponds to a second gap.

In the second structural example, the same advantages obtained in the first structural example are achieved.

Figure 7:
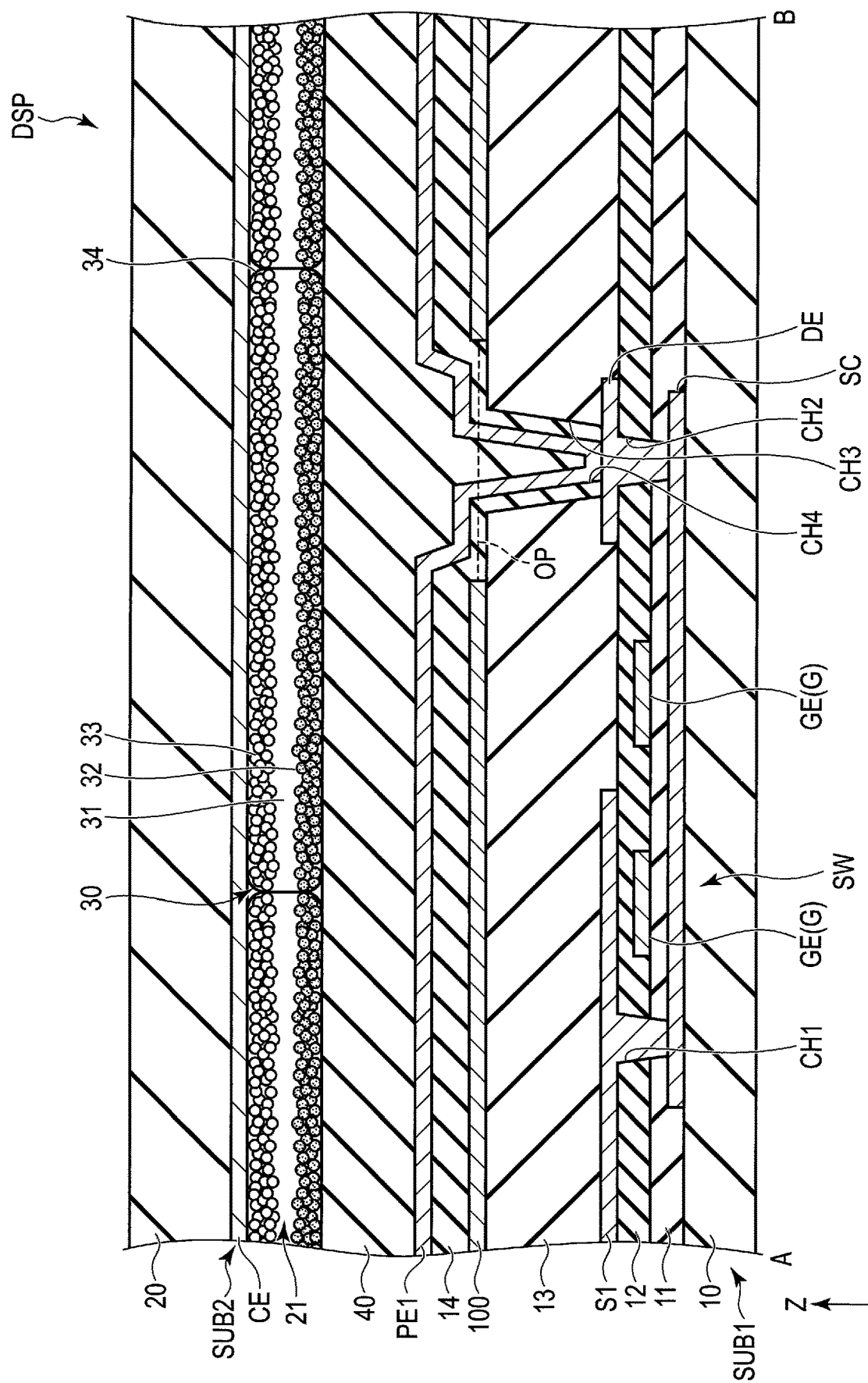
FIG. 7 is a plan view showing a third structural example of a pixel PX of the display device DSP of FIG. 1.

FIG. 7 is a plan view showing a third structural example of a pixel PX of the display device DSP of FIG. 1. The third structural example of FIG. 7 includes a switching element SW of top gate structure and the third structural example is different from the first structural example of FIG. 3 in this respect. That is, the semiconductor layer SC is positioned between the base substrate 10 and the insulating film 11. Note that another insulating film may be interposed between the base substrate 10 and the semiconductor layer SC. The gate electrode GE integrated with the scan line G is positioned between the insulating films 11 and 12. The signal line S1 is in contact with the semiconductor layer SC in the through hole CH1 passing through the insulating films 11 and 12. The drain electrode DE is in contact with the semiconductor layer SC in the through hole CH2 passing through the insulating films 11 and 12. The other structure is the same as in the first structural example.

In the third structural example, the same advantages obtained in the first structural example are achieved. Note that the switching element SW of the second structural example may be the above-mentioned switching element of top gate structure.

Figure 8:
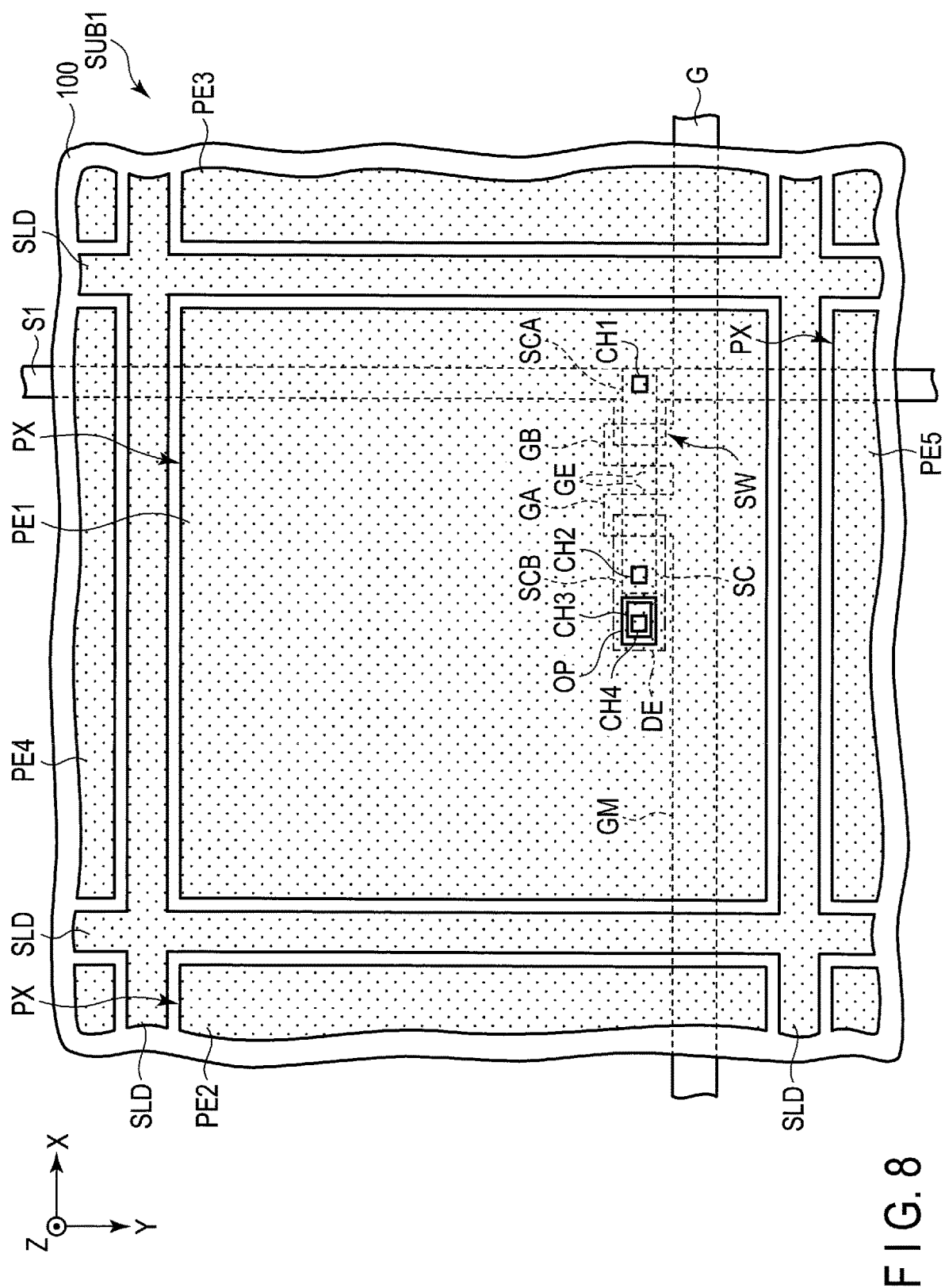
FIG. 8 is a plan view showing a fourth structural example of a pixel PX of the display device DSP of FIG. 1.

FIG. 8 is a plan view of a fourth structural example of a pixel PX of the display device DSP of FIG. 1. The fourth structural example of FIG. 8 includes a switching element SW shaped differently from that of the first structural example of FIG. 2. That is, the scan line G includes a main part GM and branches GA and GB connected to the main part GM. The main part GM extends in the first direction X. The branches GA and GB extend along the second direction Y and are arranged along the first direction X.

The semiconductor layer SC extends in the first direction X. The end SCA is electrically connected to the signal line S1 in the through hole CH1. The end SCB overlaps the drain electrode DE and is electrically connected to the drain electrode DE in the through hole CH2. The semiconductor layer SC crosses the branches GA and GB between the ends SCA and SCB. The gate electrode GE corresponds to an area of the branches GA and GB where overlaps the semiconductor layer SC.

The capacitance electrode 100 includes, in each pixel PX, an opening OP in a position overlapping the drain electrode DE. The pixel electrode PE1 is electrically connected to the drain electrode DE in the opening OP and through holes CH3 and CH4.

The shield layer SLD is formed as, in a plan view, a lattice surrounding the pixel electrode PE1, and overlaps the capacitance electrode 100. The shield layer SLD is apart from each of the pixel electrodes PE1 to PE5. The shield layer SLD crosses the scan line G between the pixel electrodes PE1 and PE2 and between the pixel electrodes PE1 and PE3, and crosses the signal line S1 between the pixel electrodes PE1 and PE4 and between the pixel electrodes PE1 and PE5.

In the fourth structural example, the same advantages obtained in the first structural example are achieved. Note that the switching element SW of the second structural example may be the switching element shaped as in the figure. Or, the switching element SW may be the switching element of top gate structure of FIG. 7.

As can be understood from the above, in the present embodiment, a display device which can suppress deterioration of display quality can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the display device with the structures disclosed in the present application will be noted below.

(1)
A display device comprising:
a capacitance electrode;
a first pixel electrode overlapping the capacitance electrode;
a second pixel electrode overlapping the capacitance electrode and adjacent to the first pixel electrode;
a shield layer disposed between the first pixel electrode and the second pixel electrode and being apart from the first pixel electrode and the second pixel electrode;
a common electrode; and
an electrophoretic element disposed between the common electrode and the first pixel electrode and between the common electrode and the shield layer, wherein
the first pixel electrode and the second pixel electrode are arranged along a first direction, and
the shield layer extends in a second direction which crosses the first direction between the first pixel electrode and the second pixel electrode.

(2)
The display device of (1), wherein the first pixel electrode, the second pixel electrode, and the shield layer are disposed in the same layer, and
a first gap between the shield layer and the first pixel electrode and a second gap between the shield layer and the second pixel electrode are less than a third gap between the shield layer and the electrophoretic element.

(3)
The display device of (2), wherein the first gap and the second gap are ⅓ or less than the third gap.

(4)
The display device of (3), wherein the first gap and the second gap are 5 µm or less.

(5)
The display device of (1), wherein the shield layer is formed as a lattice surrounding the first pixel electrode in a plan view.

(6)
The display device of (5), further comprising a metal line overlapping each of the first pixel electrode and the second pixel electrode, wherein
the shield layer crosses the metal line.

(7)
The display device of (6), wherein the first pixel electrode, the second pixel electrode, and the shield layer are formed of a transparent conductive material.

(8)
The display device of (7), wherein the shield layer is electrically floating.

(9)
A display device comprising:
a scan line extending in a first direction;
a signal line extending in a second direction crossing the first direction;
a capacitance electrode overlapping the scan line and the signal line;
a pixel electrode overlapping the capacitance electrode; and
a shield layer formed as a lattice surrounding the pixel electrode in a plan view, wherein
the shield layer is apart from the pixel electrode, and
the shield layer crosses the scan line and the signal line in a plan view.

(10)
The display device of (9), wherein the shield layer is electrically floating.

(11)
The display device of (10), wherein the pixel electrode and the shield layer are disposed in the same layer.

(12)
The display device of (11), wherein the pixel electrode and the shield layer are formed of a transparent conductive material.

(13)
A display device comprising:
a capacitance electrode;
a first pixel electrode overlapping the capacitance electrode;
a second pixel electrode overlapping the capacitance electrode and adjacent to the first pixel electrode;
a common electrode; and
an electrophoretic element disposed between the common electrode and the first pixel electrode, wherein
a first gap between the first pixel electrode and the second pixel electrode is less than a second gap between the first pixel electrode and the electrophoretic element.

(14)
The display device of (13), wherein the first gap is ⅓ or less than the second gap.

(15)
The display device of (14), wherein the first gap is 5 µm or less.

What is claimed is:
1. A display device comprising:
a switching element;
an organic insulating film disposed on the switching element;
a capacitance electrode disposed on the organic insulating film;
an inorganic insulating film covering the capacitance electrode;
a first pixel electrode disposed on the inorganic insulating film and overlapping the capacitance electrode;
a second pixel electrode disposed on the inorganic insulating film, overlapping the capacitance electrode and adjacent to the first pixel electrode;
a shield layer disposed on the inorganic insulating film, being in contact with the inorganic insulating film, located between the first pixel electrode and the second pixel electrode and being apart from the first pixel electrode and the second pixel electrode;
a common electrode; and
an electrophoretic element disposed between the common electrode and the first pixel electrode and between the common electrode and the shield layer, wherein the first pixel electrode is electrically connected to the switching element in an opening of the capacitance electrode, a first hole of the organic insulating film, and a second hole of the inorganic insulating film, a stacked body of the capacitance electrode, the inorganic insulating film, and the shield layer overlaps the electrophoretic element, the first pixel electrode and the second pixel electrode are arranged along a first direction, and the shield layer extends in a second direction which crosses the first direction between the first pixel electrode and the second pixel electrode.

2. The display device of claim 1, wherein the first pixel electrode, the second pixel electrode, and the shield layer are disposed in the same layer, and a first gap between the shield layer and the first pixel electrode and a second gap between the shield layer and the second pixel electrode are less than a third gap between the shield layer and the electrophoretic element.

3. The display device of claim 2, wherein the first gap and the second gap are ⅓ or less than the third gap.

4. The display device of claim 3, wherein the first gap and the second gap are 5 μm or less.

5. The display device of claim 1, wherein the shield layer is formed as a lattice surrounding the first pixel electrode in a plan view.

6. The display device of claim 5, further comprising a metal line overlapping each of the first pixel electrode and the second pixel electrode, wherein the shield layer crosses the metal line.

7. The display device of claim 6, wherein the first pixel electrode, the second pixel electrode, and the shield layer are formed of a transparent conductive material.

8. The display device of claim 7, wherein the shield layer is electrically floating.

9. A display device comprising:

a scan line extending in a first direction;

a signal line extending in a second direction crossing the first direction;

a switching element electrically connected to the scan line and the signal line;

an organic insulating film disposed on the switching element;

a capacitance electrode disposed on the organic insulating film and overlapping the scan line and the signal line;

an inorganic insulating film covering the capacitance electrode;

a pixel electrode disposed on the inorganic insulating film and overlapping the capacitance electrode; and a shield layer disposed on the inorganic insulating film, being in contact with the inorganic insulating film, and formed as a lattice surrounding the pixel electrode in a plan view, wherein the pixel electrode is electrically connected to the switching element in an opening of the capacitance electrode, a first hole of the organic insulating film, and a second hole of the inorganic insulating film, a stacked body of the capacitance electrode, the inorganic insulating film, and the shield layer overlaps the electrophoretic element, the shield layer is apart from the pixel electrode, and the shield layer crosses the scan line and the signal line in a plan view.

10. The display device of claim 9, wherein the shield layer is electrically floating.

11. The display device of claim 10, wherein the pixel electrode and the shield layer are disposed in the same layer.

12. The display device of claim 11, wherein the pixel electrode and the shield layer are formed of a transparent conductive material.

13. A display device comprising:

a switching element;

an organic insulating film disposed on the switching element;

a capacitance electrode disposed on the organic insulating film;

an inorganic insulating film covering the capacitance electrode;

a first pixel electrode disposed on the inorganic insulating film and overlapping the capacitance electrode;

a second pixel electrode disposed on the inorganic insulating film and overlapping the capacitance electrode and adjacent to the first pixel electrode;

a shield layer disposed on the inorganic insulating film and being in contact with the inorganic insulating film;

a common electrode; and an electrophoretic element disposed between the common electrode and the first pixel electrode, wherein the first pixel electrode is electrically connected to the switching element in an opening of the capacitance electrode, a first hole of the organic insulating film, and a second hole of the inorganic insulating film, a stacked body of the capacitance electrode, the inorganic insulating film, and the shield layer overlaps the electrophoretic element, a first gap between the first pixel electrode and the second pixel electrode is less than a second gap between the first pixel electrode and the electrophoretic element.

14. The display device of claim 13, wherein the first gap is ⅓ or less than the second gap.

15. The display device of claim 14, wherein the first gap is 5 μm or less.

* * * * *